(12) United States Patent
Wang et al.

(10) Patent No.: US 9,841,349 B2
(45) Date of Patent: Dec. 12, 2017

(54) METHOD FOR DISTRIBUTEDLY MEASURING POLARIZATION TRANSMISSION MATRICES OF OPTICAL FIBER AND SYSTEM THEREOF

(71) Applicant: University of Electronic Science and Technology of China, Chengdu, Sichuan (CN)

(72) Inventors: Zinan Wang, Sichuan (CN); Yun Fu, Sichwan (CN); Yunjiang Rao, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 0 days.

(21) Appl. No.: 15/382,671

(22) Filed: Dec. 18, 2016

(65) Prior Publication Data

US 2017/0097281 A1    Apr. 6, 2017

(30) Foreign Application Priority Data

Aug. 3, 2016    (CN) .......................... 2016 1 0627305

(51) Int. Cl.
*G01N 21/00* (2006.01)
*G01M 11/00* (2006.01)

(52) U.S. Cl.
CPC .............................. *G01M 11/3181* (2013.01)

(58) Field of Classification Search
CPC ..... G01H 9/00; G01M 11/3181; G01N 15/05; G01N 1/28; G01N 15/0227; G01N 33/483; G01N 2001/2893; G01N 2015/0038; G01N 15/06; G01N 15/02; G01N 21/64; B82Y 35/00
See application file for complete search history.

(56) References Cited

FOREIGN PATENT DOCUMENTS

CN    203376053 U  *  1/2014  ............... G01H 9/00

\* cited by examiner

*Primary Examiner* — Jamil Ahmed

(57) ABSTRACT

A method for distributedly measuring polarization transmission matrices of an optical fiber includes steps of: inputting a fully polarized pulse into the optical fiber with linear birefringence only; and demodulating polarization states of Rayleigh backscattered light at different points on the optical fiber from a pulse input end; after demodulating, dividing the polarization states of the Rayleigh backscattered light into Q groups in sequence, wherein every three polarization states are divided into one group; calculating a transmission matrix of Group N; and solving the equation set using a numerical analysis method for obtaining multiple solutions, and screening the multiple solutions according to characteristics of the polarization transmission matrix, wherein each time of screening provides a unique solution $M_x(N)$ of the equation set; continually updating $M_A$ values for iteration, so as to obtain the distribution of polarization transmission matrices of the optical fiber.

5 Claims, 2 Drawing Sheets

METHOD FOR DISTRIBUTEDLY MEASURING POLARIZATION TRANSMISSION MATRICES OF OPTICAL FIBER AND SYSTEM THEREOF

CROSS REFERENCE OF RELATED APPLICATION

The present invention claims priority under 35 U.S.C. 119(a-d) to CN 201610627305.4, filed Aug. 3, 2016.

BACKGROUND OF THE PRESENT INVENTION

Field of Invention

The present invention relates to a method for measuring polarization transmission matrices of an optical fiber, belonging to fields of optical fiber measurement and sensors. More particularly, the present invention relates to a method for distributedly measuring polarization transmission matrices of an optical fiber and a system thereof.

Description of Related Arts

Polarization is one of the fundamental properties of light. When the light is transmitted in the fiber, the polarization states of the light are changed by the fiber's own parameters (intrinsic birefringence, polarization mode coupling, polarization mode dispersion, etc.), bending and twisting caused by external environment and stress variation. For optical communication systems, this change in the polarization states will cause adverse effects, such as causing inter-symbol interference in the digital transmission channel, and destroying the orthogonality of the polarization states in the WDM system. Therefore, the measurement of polarization-dependent parameters becomes particularly important.

Rayleigh backscattered light of short-pulses in the optical fiber is used to monitor the polarization changes along the fiber length, and then changes of fiber polarization-related parameters or environmental parameters are obtained. The technology is known as polarization-sensitive optical time-domain reflectometry, wherein the advantages thereof are: being non-destructive, which will not damage the optical fiber, and will not affect forward transmission of light; and single-ended measurement, wherein the light source and the detector are at the same end of the fiber to be tested, so as to provide far end measurement of long distance fibers.

However, the conventional measurement methods have obvious limitations. In particular, most of the methods only obtain birefringent scalars, rather than birefringent vectors. Therefore, the conventional polarization-sensitive optical time-domain reflectometry can only sense a single-position perturbation on the fiber in once measurement, and lacks ability to effectively detect the simultaneous perturbations of multiple points. For detecting the simultaneous perturbations of multiple points, it is necessary to distributedly measure the polarization states in the transmission direction of the optical pulse in the optical fiber, which needs to measure the fiber polarization transmission matrices (i.e., the Mueller matrices) in a distributed way. As far as we know, there is no way to measure the Mueller matrices distributedly.

If a moderate-power single pulse with a short duration (non-linear birefringence is not induced) is input into the fiber, the transmitted polarization state $S_t$ in the Stokes space can be expressed as:

$$S_t = M(z) S_{in} \qquad (1)$$

wherein $S_{in}$ represents polarization of light transmitted from point 0; M(z) represents normalized 4×4 polarization transmission matrix (the Mueller matrix) from the input end of the fiber (point 0) to the scattering point (point z) without non-linear birefringence. The polarization state of Rayleigh backscattered light at point z received at point 0 can be expressed as:

$$S_B = M_s M(z)^T M_s M(z) S_{in} \qquad (2)$$

wherein $S_B$ is the polarization state of Rayleigh backscattering light demodulated at point 0; $M(z)^T$ represents the transpose of M(z); and $M_s$ can be expressed as:

$$M_s = \begin{pmatrix} 1 & 0 & 0 & 0 \\ 0 & 1 & 0 & 0 \\ 0 & 0 & 1 & 0 \\ 0 & 0 & 0 & -1 \end{pmatrix} \qquad (3)$$

For most optical fibers, linear birefringence is dominant in the absence of non-linear birefringence in the fiber. The reason is that circular birefringence can be neglected in most cases because the propagation constant difference between the left-handed and right-handed circular polarizations is very small relative to the two orthogonal linear modes.

The polarization transmission matrices M(z) have some symmetric features. In the presence of linear birefringence only, the polarization transmission matrix of the fiber from the point 0 to point z, namely the Mueller matrix, can be expressed as:

$$M(z) = \begin{pmatrix} 1 & 0 & 0 & 0 \\ 0 & \cos^2 2\theta + \sin^2 2\theta \cos\gamma & \cos 2\theta \sin 2\theta - \cos 2\theta \sin 2\theta \cos\gamma & \sin\gamma \sin 2\theta \\ 0 & \sin 2\theta \cos 2\theta - \sin 2\theta \cos 2\theta \cos\gamma & \sin^2 2\theta + \cos^2 2\theta \cos\gamma & -\cos 2\theta \sin\gamma \\ 0 & -\sin\gamma \sin 2\theta & \cos 2\theta \sin\gamma & \cos\gamma \end{pmatrix} \qquad (4)$$

wherein $\gamma = L|\Delta\beta| = L(|\beta_L|^2 + |\Delta\beta_C|^2)^{1/2}$, $\theta$ is an angle between the fast axis and the x-axis of the reference frame, L is the length of the optical fiber, $\Delta\beta_L$ is the linear birefringence, $\Delta\beta_C$ is the circular birefringence, and $\Delta\beta$ is the total birefringence. The parameter $\phi$ is defined as $\tan(\phi) = |\Delta\beta_C|/|\Delta\beta_L|$, $\phi \in [-\pi/2, \pi/2]$. According to the assumption of the present invention, the propagation constants of the left-handed and the right-handed circular polarizations are equal, i.e. $\phi = 0$, so the term related to the parameter $\phi$ are omitted in the equation (4).

From the equation (4), symmetric features of the Mueller matrices can be obtained. The element at the second row and the third column equals to the elements of the third row and the second column; the element of the second row and the fourth column is negative to the element of the fourth row and the second column; and the element of the third row and the fourth column is negative to the element of the fourth row and the third column. Due to the symmetric features of the Mueller matrices, $$M_s M(z)^T M_s = M(z) \qquad (5).$$

It should be noted that the positive integer powers of the Muller matrices have the same symmetric features and, at the same time, have the same sign distribution as the first power.

SUMMARY OF THE PRESENT INVENTION

For overcoming the above technical defects, the present invention is to provide a method for distributedly measuring polarization transmission matrices of an optical fiber, which precisely and distributedly measures the polarization transmission matrices of the optical fiber with linear birefringence only.

Accordingly, in order to accomplish the above object, the present invention provides:

a method for distributedly measuring polarization transmission matrices of an optical fiber, comprising steps of:

inputting a fully polarized pulse into the optical fiber with linear birefringence only; and demodulating polarization states of Rayleigh backscattered light at different points on the optical fiber from a pulse input end;

after demodulating, dividing the polarization states of the Rayleigh backscattered light into Q groups in sequence, wherein every three polarization states are divided into one group;

calculating the transmission matrix of Group N, defining polarization transmission matrices corresponding to a segment from $(3N-3)\Delta z$ to $(3N-2)\Delta z$, a segment from $(3N-2)\Delta z$ to $(3N-1)\Delta z$, and a segment from $(3N-1)\Delta z$ to $(3N)\Delta z$ as $M_{3N-2}$, $M_{3N-1}$ and $M_{3N}$; wherein due to slow changes of principle polarization axes of the optical fiber, $M_{3N-2}=M_{3N-1}=M_{3N}=M_x(N)$, so that $M_x(N)$ is the transmission matrix of the Group N; in the descriptions above, $\Delta z$ is a pulse width, N is a positive integer from 1 to Q; and listing an equation set:

$$\begin{cases} S_B^0(3N-2) = M_A \cdot M_x^2(N) \cdot M_A \cdot S_{in} \\ S_B^0(3N-1) = M_A \cdot M_x^4(N) \cdot M_A \cdot S_{in} \\ S_B^0(3N) = M_A \cdot M_x^6(N) \cdot M_A \cdot S_{in} \end{cases} \quad (6)$$

wherein in the equation (6):

$$M_A = M_{3N-3} \cdot M_{3N-4} \ldots M_2 \cdot M_1 = M_x^3(N-1) \ldots M_x^3 \quad (1);$$

$S_{in}$ is a polarization state of an input light;
$S_B^0(3N-2)$ is a polarization state backscattered from a point $(3N-2)\Delta z$ and received at point 0;
$S_B^0(3N-1)$ is a polarization state backscattered from a point $(3N-1)\Delta z$ and received at point 0;
$S_B^0(3N)$ is a polarization state backscattered from a point $(3N)\Delta z$ and received at point 0; and solving the equation set using a numerical analysis method in order to obtain multiple solutions, and screening the multiple solutions according to characteristics of the polarization transmission matrix, wherein each time of screening provides a unique solution $M_x(N)$ of the equation set; continually updating $M_A$ values for iteration, so as to obtain the polarization transmission matrices along the optical fiber, namely each matrix corresponding to every pulse width is acquired. Screening the multiple solutions simultaneously satisfies conditions of:

(1) the transmission matrix is an orthogonal matrix, wherein specifically, $M_x^T M_x = I$, and I is a 4×4 identity matrix;

(2) all elements in the transmission matrix are real numbers, and absolute values thereof are no more than 1;

(3) positive integer powers of the transmission matrix have the same symmetric features and the same sign distribution as the first power, and $M_x$ and $M_x^2$ have the same form;

(4) all the elements in the polarization transmission matrix satisfy corresponding trigonometric function relations.

The condition (4) comprises:

a) $\Delta z$ is small enough to satisfy that $\cos(\gamma)$ is larger than 0, and diagonal elements $m_{11}$, $m_{22}$ and $m_{33}$ are no less than 0;

b) if $m_{31}$ and $m_{32}$ have the same signs, then $m_{21}$ and $m_{12}$ are both negative; if $m_{31}$ and $m_{32}$ have different signs, then $m_{21}$ and $m_{12}$ are both positive;

wherein, $m_{11}$ is an element at row 2 and column 2 in the Mueller matrix to be solved;

$m_{22}$ is an element at row 3 and column 3 in the Mueller matrix to be solved;

$m_{33}$ is an element at row 4 and column 4 in the Mueller matrix to be solved;

$m_{12}$ is an element at row 2 and column 3 in the Mueller matrix to be solved;

$m_{21}$ is an element at row 3 and column 2 in the Mueller matrix to be solved;

$m_{31}$ is an element at row 4 and column 2 in the Mueller matrix to be solved.

Power levels and pulse widths of pulses generated by the input light source are adjustable.

The light from the input light source is fully polarized light whose detailed polarization state values are available, and a polarization state of the input light is adjustable.

With the foregoing method, almost not any precise parameter selection for the input polarization state is needed during operation. All operations may be completed with one polarization state, so as to precisely obtain the polarization transmission matrix corresponding to any of the pulse widths in the optical fiber. Application prospection is magnificent for distributed optical fiber parameter measurement and distributed optical fiber sensors.

Meanwhile, in order to facilitate implementation of the method, the present invention also provides a system for distributedly measuring polarization transmission matrices of an optical fiber, comprising: an input light generating unit, a polarization control unit, a polarization-maintaining circulator, and the optical fiber under test, which are connected in sequence, wherein the polarization-maintaining circulator is also connected to a polarization analyzing module;

wherein, the input light generating unit launches a light signal as input light;

the polarization control unit transforms the input light into fully polarized light with a certain polarization state;

the fully polarized light is transmitted from a port 1 to a port 2 of the polarization-maintaining circulator, and then enters the optical fiber through the port 2;

a Rayleigh backscattered lightwave of the optical fiber is transmitted from the port 2 to a port 3 of the polarization-maintaining circulator; and the port 3 of the polarization-maintaining circulator is connected to the polarization analyzing module, and the Rayleigh backscattered light is sampled and recorded by the polarization analyzing module.

All elements are connected with polarization-maintaining optical fibers.

Compared with conventional technologies, the present invention has advantages such as a simpler system structure, less hardware, lower requirement, and ability to precisely obtain the polarization transmission matrices of the optical fiber.

These and other objectives, features, and advantages of the present invention will become apparent from the following detailed description, the accompanying drawings, and the appended claims.

BRIEF DESCRIPTION OF THE DRAWINGS

Referring to the drawings and a preferred embodiment, the present invention is further illustrated.

Figure 1:
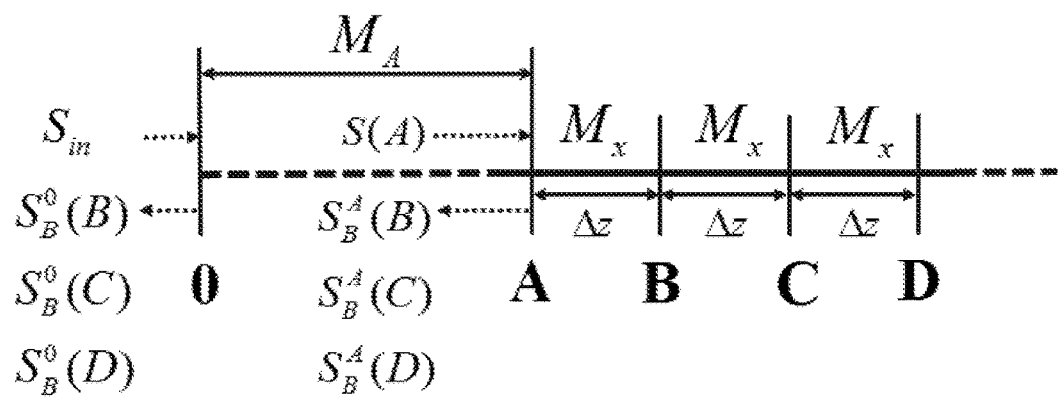
FIG. 1 shows a theoretical model for measuring polarization transmission matrices of an optical fiber.

Element reference: 1—input light generating unit, 2—polarization control unit, 3—polarization-maintaining circulator, 4—optical fiber under test, 5—polarization analyzing module.

DETAILED DESCRIPTION OF THE PREFERRED EMBODIMENT

Referring to the drawings, the present invention is further illustrated. The present invention comprises but is not limited to the following preferred embodiments.

A method of the present invention is based on the following four assumptions: 1) an input light is transmitted in an optical fiber without polarization-dependent loss; 2) the left-handed and right-handed circular polarization states have the same transmission speed; 3) there is no non-linear birefringence; 4) principle polarization axes changes slowly. The former two assumptions are valid for most optical fibers, and the latter two are illustrated as follows.

First of all, it is essential to explain how to eliminate non-linear birefringence in the fiber. If this assumption is true, the power level of input light must satisfy conditions as follows. Since the present invention only obtains polarization transmission matrices in a case of linear birefringence, the input light power is required to be sufficiently small that no non-linear birefringence affects polarization transmission. $P_{cr}$ may be used to determine whether there is non-linear birefringence generated. An expression for $P_{cr}$ is:

$$P_{cr} = 3|\Delta\beta|/(2\chi) \quad (7)$$

wherein $\Delta\beta$ is the differential group delay (DGD) and $\chi$ is an inherent non-linear parameter. In the present invention, the input light power ($P_{in}$) should be smaller than a value calculated in the equation (7), i.e., $P_{in} < P_{cr}$.

After that, the present invention requires that the principle polarization axes of the optical fiber change slowly, namely an optical fiber whose length is 3 times of a pulse width is treated as a "short" fiber (polarization-maintaining fiber). Difference between the "short" fiber and a "long" fiber should be noticed. In terms of light polarization, the optical fiber, which is short enough so that there is no polarization coupling, is called the "short" fiber. Otherwise, the optical fiber is called the "long" fiber. One way to judge whether the optical fiber is the "short" optical fiber can be expressed by a correlation length $L_c$. $L_c$ may be estimated by:

$$L_c \approx \frac{2\lambda^2}{B\Delta\lambda} \quad (8)$$

In the equation (8), $\lambda$ is a wavelength of the input light, $\Delta\lambda$ is a line width of an input pulse; B is the effective refractive index difference between the slow axis and the fast axis in the optical fiber, which shares a relationship with the linear birefringence $\Delta\beta_L$ that: $B=\Delta\beta_L/(2\pi/\lambda)$. A typical correlation length of an optical fiber cable is on an order of kilometer. When the length of the optical fiber is far less than the correlation length, the optical fiber is regarded as the "short" optical fiber. The "short" optical fiber has no polarization mode coupling, so the principle polarization axes never change. Since the input pulse width is able to be controlled on an order of meter, the optical fiber with a length of the same order as the input pulse width is surely able to be regarded as the "short" optical fiber. The "long" fiber may be viewed as a cascading of a limited number of "short" optical fibers. Assuming that the "long" optical fiber consists of S "short" optical fibers, and the polarization transmission matrix corresponding to each of the "short" optical fibers is $M_i$ (i=1, 2, . . . , S), then the polarization transmission matrix $M_l$ of the long fiber is:

$$M_l = M_S M_{S-1} \ldots M_2 M_1 \quad (9)$$

Based on the above illustration and explanation, the method of the present invention will be illustrated in detail.

Referring to FIG. 1, a theoretical model for measuring transmission matrices of an optical fiber is shown, wherein there is an interval equaling to the pulse width respectively between points A and B, points B and C, as well as points C and D, and corresponding $M_x$ thereof should be solved. S(A) is the polarization state of the transmission light at the point A, and $M_A$ is the polarization transmission matrix from the point 0 to the point A, which is assumed to be known. $S_B^A(\Delta z)$, $S_B^A(2\Delta z)$ and $S_B^A(3\Delta z)$ are respectively the polarization states demodulated at the point A of the lights backscattered to the point A from the points B, C, and D; and $S_B^0(\Delta z)$, $S_B^0(2\Delta z)$ and $S_B^0(3\Delta z)$ are respectively the polarization states of the lights backscattered to the point 0 from the points B, C, and D.

Supposing that the pulse width is $\Delta z$, and if the input pulse length is in an order of meter, then an optical fiber with the length of $3\Delta z$ is able to be regarded as the "short" optical fiber. Therefore, the optical fiber from the point A to the point D is able to be regarded as a segment of polarization-maintaining fiber. If distances between adjacent sampling points equal to each other, then the polarization transmission matrices of adjacent sampling points equal to each other. That is to say, the Mueller matrix of each segment is the same. Referring to FIG. 1, distances between adjacent sampling points equal to the pulse width $\Delta z$, i.e., the distances between the points A and B, the points B and C, and the points C and D are all $\Delta z$. Therefore, they correspond to the same polarization transmission matrix.

A light transmission direction is defined as the z-axis direction of a reference three-dimensional coordinate, and a fixed direction which is vertical to the z-axis direction is defined as the x-axis direction, then a y-axis direction may be defined by right-hand rule. With such a coordinate, a normalized Mueller matrix $M_x$ corresponding to the desired $\Delta z$ is ($m_{12}=m_{21}$, $m_{13}=-m_{31}$, $m_{23}=-m_{32}$):

$$M_x = \begin{pmatrix} 1 & 0 & 0 & 0 \\ 0 & m_{11} & m_{12} & m_{13} \\ 0 & m_{21} & m_{22} & m_{23} \\ 0 & m_{31} & m_{32} & m_{33} \end{pmatrix} \quad (10)$$

It is supposed that $S_B^A(\Delta z)$, $S_B^A(2\Delta z)$ and $S_B^A(3\Delta z)$ are respectively the polarization states demodulated at the point A of the lights backscattered to the point A from the points B, C, and D, and S(A) is the polarization state of the transmission light at the point A. According to the equation (2), the process wherein the transmission light reaches the point A and then is backscattered to the points B, C and D may be expressed with the following equations:

$$\begin{cases} S_B^A(\Delta z) = M_s M_x^T M_s M_x \cdot S(A) \\ S_B^A(2\Delta z) = M_s (M_x^T)^2 M_s M_x^2 \cdot S(A) \\ S_B^A(3\Delta z) = M_s (M_x^T)^3 M_s M_x^3 \cdot S(A) \end{cases} \quad (11)$$

By introducing the equation (5) into the equation (11), it is known that:

$$\begin{cases} S_B^A(\Delta z) = M_x^2 \cdot S(A) \\ S_B^A(2\Delta z) = M_x^4 \cdot S(A) \\ S_B^A(3\Delta z) = M_x^6 \cdot S(A) \end{cases} \quad (12)$$

If an input polarization state $S_{in}$ and the polarization transmission matrix $M_A$ from the points 0 to A are known, then the transmission light polarization state at the point A is expressed as:

$$S(A) = M_A \cdot S_{in} \quad (13)$$

The Rayleigh backscattered lights scattered to the point A from the points B, C and D, return to the point 0 from the point A through the same path together with the scattered light of the point A itself. Combined with the equations (2), (5), (12) and (13), such process is able to be expressed as:

$$\begin{cases} S_B^0(B) = M_A \cdot M_x^2 \cdot M_A \cdot S_{in} \\ S_B^0(C) = M_A \cdot M_x^4 \cdot M_A \cdot S_{in} \\ S_B^0(D) = M_A \cdot M_x^6 \cdot M_A \cdot S_{in} \end{cases} \quad (14)$$

In the equation (14), $S_B^0(\Delta z)$, $S_B^0(2\Delta z)$ and $S_B^0(3\Delta z)$ are respectively the polarization states of the lights scattered back to the point 0 from the points B, C, and D; which, together with $S_{in}$, are all known vectors measured at the point 0. With the equation (14), an equation set is able to be listed for solving the $M_x$, and there are only 6 unknowns for the Mueller matrix to be solved due to the symmetric features.

After numerical analysis on the equations (14), it is revealed that for $M_x^2$, the first sub-equation of the equation (14) is linear, so $M_x^2$ can be single valued. The Mueller matrix $M_x$ is able to be obtained from $M_x^2$. However, only by direct numerical calculation, $M_x$ cannot be uniquely determined. Numerical calculations show that there are eight solutions for $M_x$ if mathematically solved from $M_x^2$.

A typical numerical analysis method of the present invention is the Newton's method.

How to extract the unique solution from the eight solutions is illustrated as follows.

For extracting the unique solution, there are four conditions which should be satisfied simultaneously: (1) from the definition of the Mueller matrix, it is known that the Mueller matrix is an orthogonal matrix, wherein specifically, $M_x^T M_x = I$, and I is a 4×4 identity matrix; (2) all elements in the Mueller matrix are real numbers, and absolute values thereof are no more than 1; (3) due to positive integer powers of the Mueller matrix have the same symmetry and the same sign distribution (distribution of positive and negative signs) as the first power, $M_x$ and $M_x^2$ have the same form; and (4) all the elements in the Mueller matrix satisfy corresponding trigonometric function relations. The condition (4) specifically comprises: a) $\Delta z$ is small enough to satisfy that $\cos(\gamma)$ is larger than 0, and diagonal elements ($m_{11}$, $m_{22}$ and $m_{33}$) are no less than 0; and b) if $m_{31}$ and $m_{32}$ have the same signs, then $m_{21}$ and $m_{12}$ are both negative; and if $m_{31}$ and $m_{32}$ have different signs, then $m_{21}$ and $m_{12}$ are both positive. With the above conditions, the unique solution is able to be obtained through exclusion operation.

Detailed description of the theoretical model is illustrated as above.

Figure 2:
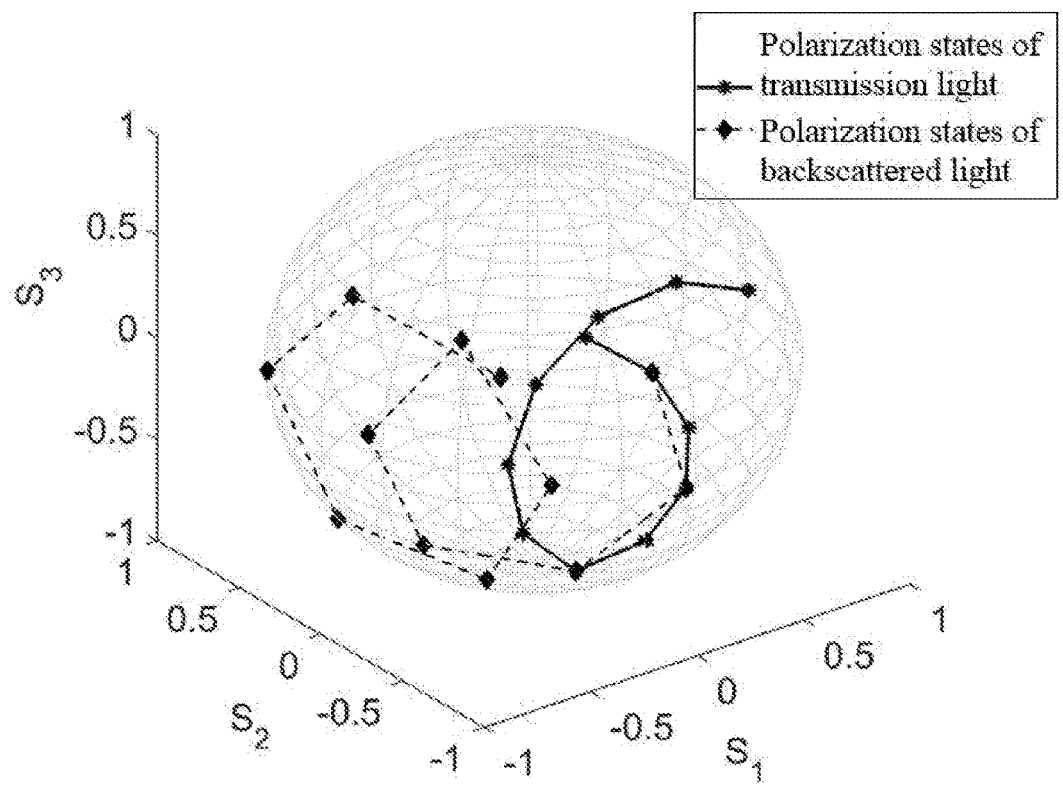
FIG. 2 shows numerical results with presetting conditions.
Figure 3:
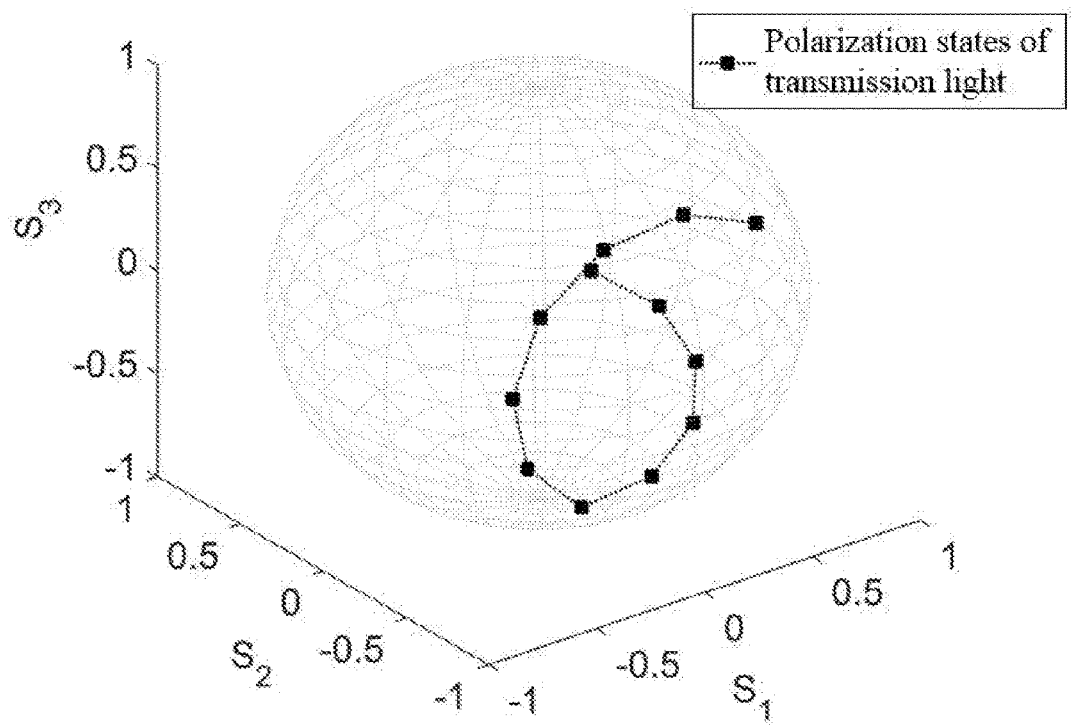
FIG. 3 shows numerical simulation results of polarization states with obtained Mueller matrices.

Referring to FIGS. 2-3, numerical simulation results are shown for proving correctness of the theoretical model. FIG. 2 shows the numerical simulation results with presetting conditions. FIG. 3 shows numerical simulation results of polarization states of transmission light calculated by obtained Mueller matrices. In detail, FIG. 2 represents the simulation results of transmitted polarization states and backscattered polarization states in the situation that the input polarization state and the transmission Mueller matrices along the fiber are preset. In FIG. 2, solid lines with star marks are trajectories of the transmission light polarization states shown on the Poincaré sphere, and dotted lines with the diamond marks indicate the polarization states at the point 0 of Rayleigh backscattered lights on different points of the optical fiber. This preset simulation system comprises two "short" optical fibers, which are connection at a position of $6\Delta z$, $\theta$ of the first "short" optical fiber is $\pi/7$, and of the second "short" optical fiber is $\pi/4$. However, in fact, in the simulation process of obtaining polarization transmission matrices, the data finally used are the input polarization state and the data presented in dotted lines with diamond marks in FIG. 2 (backscattered polarization states). When listing equations according to the equation (14) for the first time, the point A in the theoretical model coincides with the point 0, so $M_A = I$. At this time, the scattered light polarization states of the first three points and the input polarization state are used for numerically calculation and theoretical exclusion, so as to obtain the polarization transmission matrix corresponding to the first $\Delta z$. When using the equation (14) for the second time, $M_A$ is the cubic of the firstly calculated Mueller matrix. The above steps are repeated and in the N-th calculation, $M_A = M_{3N-3} \cdot M_{3N-4} \ldots M_2 \cdot M_1 = M_x^3(N-1) \ldots M_x^3(1)$. The value of $M_A$, is continually updated, so as to obtain the polarization transmission matrices for all $\Delta z$. Then with the equation (1), the transmitted polarization state for each point is able to be obtained. FIG. 3 illustrates the polarization states of all points calculated by using the polarization transmission matrices obtained. Comparing results of the presetting polarization states of transmission light and the transmission light polarization states calculated by the Mueller matrices obtained, i.e., comparing the FIG. 2 with the FIG. 3, the method is proved to be correct.

Conditions when inputting a specific polarization state will be described as follows. In order to enable each of numerical calculations to be valid, the input polarization state should avoid six situations which are (1, ±1, 0, 0), (1, 0, ±1, 0), and (1, 0, 0, ±1), i.e., $S_{in} \neq (1, ±1, 0, 0)$, (1, 0, ±1, 0), (1, 0, 0, ±1). Except the six input polarization states above, all other polarization states are feasible.

The method of the present invention firstly carries out numerical calculation based on the Rayleigh backscattered polarization states obtained at the point 0 of the optical fiber and the input polarization state, and then screens according to characteristics of the Mueller matrix. Finally, the polarization transmission matrices are successively determined. The method is simple and easy to operate, and is able to quickly and accurately calculate the polarization transmission matrices of the optical fiber.

Figure 4:
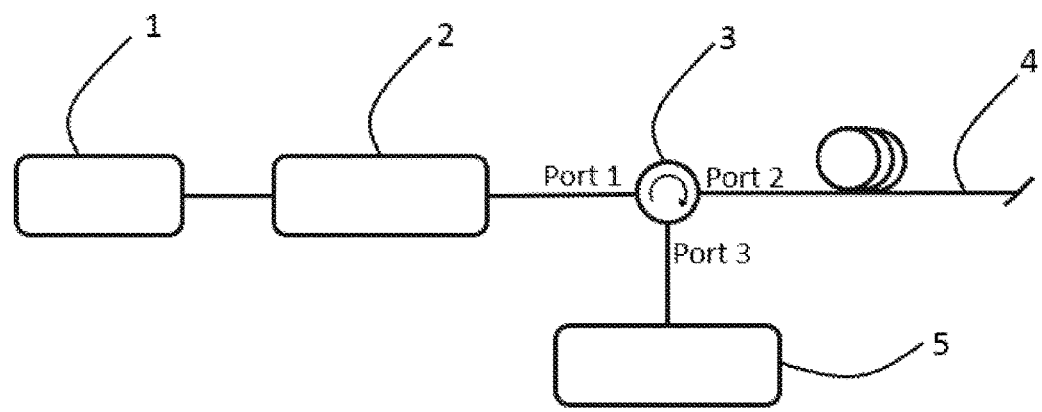
FIG. 4 shows a system for measuring polarization transmission matrices of the optical fiber.

Meanwhile, based on the above method, the present invention also provides a system for achieving the method. Referring to FIG. 4, the system comprises: an input light generating unit 1, a polarization control unit 2, a polarization-maintaining circulator 3, and the optical fiber 4 under test, which are connected in sequence, wherein the polarization-maintaining circulator 3 is also connected to a polarization analyzing module 5;

wherein, the input light generating unit 1 launches a light signal as an input lightwave;

the polarization control unit 2 transforms the input light into fully polarized light with a certain polarization state;

the fully polarized light is transmitted from a port 1 to a port 2 of the polarization-maintaining circulator 3, and then enters the optical fiber 4 through the port 2;

a Rayleigh backscattered lightwave of the optical fiber 4 is transmitted from the port 2 to a port 3 of the polarization-maintaining circulator 3; and the port 3 of the polarization-maintaining circulator 3 is connected to the polarization analyzing module 5, and the Rayleigh backscattered light is sampled and recorded by the polarization analyzing module 5.

All elements are connected with polarization-maintaining optical fibers.

When operating the system, the input power of the input light generating unit 1 is adjusted for being no higher than a power determined by the equation (7). At the same time, the input signal is adjusted to be a narrow pulse which is transformed into fully polarized light with a certain polarization state by the polarization control unit 2 after the input light generating unit 1, and the polarization state $S_{in}$ is recorded. The polarization control unit 2 is adjusted to avoid six situations which are $(1, \pm 1, 0, 0)$, $(1, 0, \pm 1, 0)$, and $(1, 0, 0, \pm 1)$. Then, the fully polarized light is transmitted from a port 1 to a port 2 of the polarization-maintaining circulator 3, and then enters the optical fiber 4 through the port 2; the Rayleigh backscattered light of the optical fiber 4 is transmitted from the port 2 to a port 3 of the polarization-maintaining circulator 3; and polarization states $S_B$ of the Rayleigh backscattered light which transmit back to the points 0 from each of the points on the optical fiber are recorded by the polarization analyzing module 5. For each time, three points are used for iteration with the equation (9), and numerical solution is obtained by the equation (14). By screening according to the characteristics of the polarization transmission matrix, the unique solution is able to be obtained.

The polarization analyzing module 5 may be a polarization analyzer.

Referring to the method and the system for distributedly measuring the polarization transmission matrices of optical fibers, the present invention is further described as below.

As shown in FIGS. 1 and 4, in the system, a moderate-power short-pulse light with a pulse width of $\Delta z$ is generated from the input light generating unit 1 as required, and the polarization control unit 2 is adjusted to avoid six polarization states which are $(1, \pm 1, 0, 0)$, $(1, 0, \pm 1, 0)$, and $(1, 0, 0, \pm 1)$. The input polarization state obtained from the polarization control unit 2 and the polarization states of the Rayleigh backscattered light transmitted back to the input point from each of the points on the optical fiber are recorded. According to the equation (14) of the model, an equation used in concrete operation is shown as the equation (6). For convenience of explanation, the equation is shown again as follows:

$$\begin{cases} S_B^0(3N-2) = M_A \cdot M_x^2(N) \cdot M_A \cdot S_{in} \\ S_B^0(3N-1) = M_A \cdot M_x^4(N) \cdot M_A \cdot S_{in} \\ S_B^0(3N) = M_A \cdot M_x^6(N) \cdot M_A \cdot S_{in} \end{cases} \quad (6)$$

When listing equations based on the equation (6) for the first time, N=1; let $M_A=I$, and the $M_x^2$ matrix is uniquely determined by numerical solution. Just by numerically calculating $M_x$ with $M_x^2$ obtained, there may be multiple solutions. By using the characteristics of the polarization transmission matrix, which are $M_x^T M_x = I$, and I is a 4×4 identity matrix; all elements in the Mueller matrix are real numbers, and trigonometric function relations as illustrated in the equation (4), the unique solution satisfying all conditions is obtained. The unique solution is recorded as $M_x(1)$, and polarization transmission matrices corresponding to the segments which are 0 to $\Delta z$, $\Delta z$ to $2\Delta z$, and $2\Delta z$ to $3\Delta z$ are recorded as $M_1$, $M_2$ and $M_3$, so $M_1=M_2=M_3=M_x(1)$. For the second calculation, the steps of the first one are repeated except for N=2. In such case, only $M_A$ needs to be updated. In the second calculation, $M_A=M_3 \cdot M_2 \cdot M_1 = M_x^3(1)$. Then, $M_A$ is continually updated and the above steps are repeated. During the N-th calculation, polarization transmission matrices $M_{3N-2}$, $M_{3N-1}$ and $M_{3N}$ corresponding to the segments which are $(3N-3)\Delta z$ to $(3N-2)\Delta z$, $(3N-2)\Delta z$ to $(3N-1)\Delta z$, and $(3N-1)\Delta z$ to $(3N)\Delta z$ are to be calculated. Because the principle polarization axes changes slowly, $M_{3N-2}=M_{3N-1}=M_{3N}=M_x(N)$. In such case, $M_A=M_{3N-3} \cdot M_{3N-4} \ldots M_2 \cdot M_1 = M_x^3(N-1) \ldots M_x^3(1)$. The equation (6) and characteristics of the polarization transmission matrix are used for calculation, and with the increase of N, the distribution of the polarization transmission matrix on the optical fiber, i.e., the Mueller matrix corresponding to each pulse width of the optical fiber is able to be obtained.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for distributedly measuring polarization transmission matrices of an optical fiber, comprising steps of:

inputting a fully polarized pulse into the optical fiber with linear birefringence only; and demodulating polarization states of Rayleigh backscattered light at different points on the optical fiber from a pulse input end;

after demodulating, dividing the polarization states of the Rayleigh backscattered light into Q groups in sequence, wherein every three polarization states are divided into one group;

calculating the transmission matrix of Group N, defining polarization transmission matrices corresponding to a segment from $(3N-3)\Delta z$ to $(3N-2)\Delta z$, a segment from $(3N-2)\Delta z$ to $(3N-1)\Delta z$, and a segment from $(3N-1)\Delta z$ to $(3N)\Delta z$ as $M_{3N-2}$, $M_{3N-1}$ and $M_{3N}$, wherein due to slow changes of principle polarization axes of the optical fiber, $M_{3N-2}=M_{3N-1}=M_{3N}=M_x(N)$, so that $M_x(N)$ is the transmission matrix of the Group N; wherein, $\Delta z$ is a pulse width, N is a positive integer from 1 to Q; and listing an equation set:

$$\begin{cases} S_B^0(3N-2) = M_A \cdot M_x^2(N) \cdot M_A \cdot S_{in} \\ S_B^0(3N-1) = M_A \cdot M_x^4(N) \cdot M_A \cdot S_{in} \\ S_B^0(3N) = M_A \cdot M_x^6(N) \cdot M_A \cdot S_{in} \end{cases}$$

wherein in the equation set:

$$M_A = M_{3N-3} \cdot M_{3N-4} \cdots M_2 \cdot M_1 = M_x^3(N-1) \cdots M_x^3 \qquad (1);$$

$s_{in}$ is a polarization state of an input lightwave;
$S_B^0(3N-2)$ is a polarization state backscattered from a point $(3N-2) \Delta z$ and received at the point 0;
$S_B^0(3N-1)$ is a polarization state backscattered from a point $(3N-1) \Delta z$ and received at the point 0;
$S_B^0(3N)$ is a polarization state backscattered from a point $(3N) \Delta z$ and received at the point 0; and
solving the equation set using a numerical analysis method in order to obtain multiple solutions, and screening the multiple solutions according to the characteristics of the polarization transmission matrix, wherein each time of screening provides a unique solution $M_x(N)$ of the equation set; continually updating $M_A$ values for iteration, so as to obtain the distribution of polarization transmission matrices of the optical fiber, which is a series of polarization transmission matrices corresponding to each pulse width of the optical fiber.

2. The method, as recited in claim 1, wherein screening the multiple solutions simultaneously satisfies conditions of:

(1) the transmission matrix is an orthogonal matrix, wherein specifically, $M_x^T M_x = I$, and I is a 4×4 identity matrix;
(2) all elements in the transmission matrix are real numbers, and absolute values thereof are no more than 1;
(3) due to positive integer powers of the transmission matrix have the same symmetric features and the same sign distribution as the first power, $M_x$ and $M_x^2$ have the same form;
(4) all the elements in a Mueller matrix satisfy corresponding trigonometric function relations.

3. The method, as recited in claim 2, wherein the condition (4) comprises:
a) $\Delta z$ is small enough to satisfy that $\cos(\gamma)$ is larger than 0, and diagonal elements $m_{11}$, $m_{22}$ and $m_{33}$ are no less than 0;
b) if $m_{31}$ and $m_{32}$ have the same signs, then $m_{21}$ and $m_{12}$ are both negative; and if $m_{31}$ and $m_{32}$ have different signs, then $m_{21}$ and $m_{12}$ are both positive;
wherein,
$m_{11}$ is an element at row 2 and column 2 in the Mueller matrix to be solved;
$m_{22}$ is an element at row 3 and column 3 in the Mueller matrix to be solved;
$m_{33}$ is an element at row 4 and column 4 in the Mueller matrix to be solved;
$m_{12}$ is an element at row 2 and column 3 in the Mueller matrix to be solved;
$m_{21}$ is an element at row 3 and column 2 in the Mueller matrix to be solved;
$m_{31}$ is an element at row 4 and column 2 in the Mueller matrix to be solved;
$m_{32}$ is an element at row 4 and column 3 in the Mueller matrix to be solved.

4. The method, as recited in claim 1, wherein power levels and pulse widths of pulses generated by the input light source are adjustable.

5. The method, as recited in claim 1, wherein the input light from the input light source is fully polarized light whose detailed polarization state values are available, and a polarization state of the input light is adjustable.

* * * * *